(12) United States Patent
Henry

(10) Patent No.: US 12,253,791 B2
(45) Date of Patent: Mar. 18, 2025

(54) LIGHT BOX FOR PHOTOGRAPHY AND VIDEOGRAPHY

(71) Applicant: Visiodome SA, Carouge (CH)

(72) Inventor: Raphaël Henry, Carouge (CH)

(73) Assignee: Visiodome SA, Carouge (CH)

( * ) Notice: Subject to any disclaimer, the term of this patent is extended or adjusted under 35 U.S.C. 154(b) by 0 days.

(21) Appl. No.: 18/275,113

(22) PCT Filed: Jan. 27, 2022

(86) PCT No.: PCT/EP2022/051848
§ 371 (c)(1),
(2) Date: Jul. 31, 2023

(87) PCT Pub. No.: WO2022/162044
PCT Pub. Date: Aug. 4, 2022

(65) Prior Publication Data
US 2024/0118591 A1   Apr. 11, 2024

(30) Foreign Application Priority Data

Jan. 29, 2021 (CH) .................................. 00086/21
Jan. 29, 2021 (EP) .................................. 21154304

(51) Int. Cl.
*G03B 15/07* (2021.01)
(52) U.S. Cl.
CPC .................. *G03B 15/07* (2013.01)
(58) Field of Classification Search
CPC .............................. G03B 15/07; G03B 15/06
See application file for complete search history.

(56) References Cited

U.S. PATENT DOCUMENTS 2,913,569 A * 11/1959 Edelstein ............... G03B 15/06
362/17
5,075,993 A * 12/1991 Weinreich ............ H04N 13/324
40/448

(Continued)

FOREIGN PATENT DOCUMENTS

DE         10129972 A1   6/2011
WO      2022128061 A1   6/2022
WO      2022128225 A1   6/2022

OTHER PUBLICATIONS

International Search Report; European Patent Office; International Application No. PCT/EP2022/051848; Jul. 22, 2022; 5 pages.

*Primary Examiner* — Tsion Tumebo
(74) *Attorney, Agent, or Firm* — Taft Stettinius & Hollister LLP

(57) ABSTRACT

A light box for photography and/or videography of an object, including a casing having a plurality of walls defining an inner volume and an access provided on a face thereof and shaped to allow the user to insert at least one hand therethrough; and an illumination/visualization system housed inside the casing and defining a working volume in communication with the access; wherein the illumination/visualization system includes at least one light diffuser element located at a predetermined distance from one of the walls in order to define a gap between the light diffuser element and the wall with the light diffuser element delineating at least partly the working volume, at least one light source located in the gap and configured to illuminate the working volume in a diffuse manner through the light diffuser element, at least one switchable, maskable or removable point light source configured to illuminate directly the working volume, and at least one digital camera mounted inside the casing and configured to allow photographing of at least a part of the working volume.

16 Claims, 10 Drawing Sheets

(56) References Cited

U.S. PATENT DOCUMENTS

| | | | | |
|---|---|---|---|---|
| 6,106,124 | A * | 8/2000 | Tarsia | G03B 15/06 |
| | | | | 362/17 |
| 7,055,976 | B2 | 6/2006 | Blanford | |
| 7,396,148 | B1 * | 7/2008 | Tsai | G03B 15/03 |
| | | | | 362/17 |
| 7,680,401 | B1 * | 3/2010 | Adelstein | G03B 17/56 |
| | | | | 396/3 |
| 8,430,516 | B2 * | 4/2013 | Hanabusa | G03B 15/06 |
| | | | | 362/296.07 |
| 9,442,347 | B1 | 9/2016 | Nyssen et al. | |
| 9,857,664 | B1 * | 1/2018 | Tang | G03B 15/06 |
| 10,565,700 | B2 * | 2/2020 | Chatterjee | G06T 7/0004 |
| 2001/0041064 | A1 * | 11/2001 | Huebner | G03B 15/06 |
| | | | | 348/E5.037 |
| 2009/0021798 | A1 * | 1/2009 | Abahri | H04N 1/195 |
| | | | | 358/474 |
| 2012/0163782 | A1 * | 6/2012 | McColl | G03B 15/06 |
| | | | | 396/3 |
| 2016/0202599 | A1 | 7/2016 | Bochenek | |
| 2020/0173930 | A1 | 6/2020 | Alonie et al. | |

* cited by examiner

LIGHT BOX FOR PHOTOGRAPHY AND VIDEOGRAPHY

CROSS REFERENCE TO RELATED APPLICATIONS

This application is a U.S. national stage filing of International Patent Application No. PCT/EP2022/051848 filed Jan. 27, 2022, which claims priority to European Application No. 21154304.6 filed Jan. 29, 2021 and also claims priority to Swiss Application No. 00086/21 filed Jan. 29, 2021, the contents of each application hereby incorporated by reference in their entirety.

TECHNICAL FIELD

The present invention relates to a light box for photography or videography. The invention relates more specifically to such a light box which is especially adapted for photography or videography of luxury objects such as timepieces, jewelry items, and the like.

STATE OF THE ART

Document U.S. Pat. No. 7,055,976 discloses a foldable photographic light box that can be assembled to provide a working volume illuminated in a diffused manner. In its working configuration, the light box, which is of square or rectangular cross-section, comprises three side walls, a bottom element, as well as an illumination system acting as ceiling and housing a fluorescent tube which illuminates the interior of the light box through a diffuser element to provide diffuse light. The light box is open forward so that a user can place an object therein and photograph it through the missing wall.

After use, the illumination unit can be removed from the walls and stored inside the bottom element, which exhibits to this end a hollow shape. The three side walls are then folded inside so that the rear wall acts as cover for the assembly.

This type of light box is quite conventional and is commonly used for photography and videography in general (hereinafter referred to simply as "photography"). However, this light box has limitations with respect to photography of certain objects, such as timepieces (watches) and jewelry items. The produced diffuse light is very "flat" and does not allow sparkle of cut stones. Furthermore, details of the decoration (guilloche, textures, and the like) are sometimes difficult to photograph clearly, especially when the contrast thereof is limited.

Moreover, such conventional light boxes are hardly adaptable to use in real time for the purpose of showing objects to persons located remotely via a network such as the internet, for instance for remote sale, in particular due to the fact that the camera must be placed outside of the light box and hinders work of the user in the event he or she wants to manipulate the object.

Document US2016/202599 discloses a light box having a cylindrical shape, which comprises an illumination system comprising LEDs that are placed in a gap located behind a diffuser, additional light sources being providable inside the light box. A support for a camera is provided outside of the light box, which necessitates the provision of a separate camera and assembly thereof to the light box before use thereof.

Document U.S. Pat. No. 9,442,347 discloses a foldable light box which does not provide for any camera or any support for a camera, and which does not comprise any additional point light sources either.

The aim of the invention is accordingly to provide a light box in which the aforementioned defects are at least partially overcome.

DISCLOSURE OF THE INVENTION

More specifically, the invention relates to a light box for photography and/or videography of an object, comprising:
  a casing of any given shape, comprising a plurality of walls defining an inner volume as well as an access provided on a face of said casing and intended to be directed towards a user in a working configuration (i.e. a frontal face), the access being shaped to allow the user to insert at least one hand therethrough to manipulate said object;
  an illumination and visualization system housed inside the casing and defining a working volume in communication with said access to allow the user to access the working volume with one or both hands.
The illumination and visualization system comprises:
  at least one light diffuser element (such as a plate made of translucent plastic material) which is located at a predetermined distance from at least one of said walls in order to define a gap between said light diffuser element and said at least one of said walls, said light diffuser element being also configured to at least partly delineate said working volume;
  at least one light source located in said gap and configured to illuminate said working volume in a diffuse manner through said light diffuser element;
  at least one switchable, maskable or removable point light source configured to illuminate directly said working volume, without the emitted light being diffused by said diffuser element, which point light source may be one or more spotlights and/or several LEDs, optical fibers or the like;
  at least one digital camera mounted inside said casing and integrated to said illumination and visualization system, which is configured to allow photographing of at least a part of said working volume, the digital images captured by the camera being of course communicable to a computer, tablet, smartphone or the like, integrated to, positioned on, proximate to or at a distance from the light box.

By these means, objects visualized by the integrated camera can be illuminated in an optimal manner, depending on their optical properties (surface condition, presence or absence of cut stones, of reflecting zones, of textured surface zones and of low contrast, and the like). In addition, since the camera is integrated into the light box, the handling and presentation of the object are significantly facilitated compared to the use of an external camera.

Advantageously, said access can be closable, which protects the working volume from dust, dirt and the like during its transport and its storage.

Advantageously, said light box can comprise a support configured to support a screen, a tablet computer or a smartphone on the outside of said casing facing said user.

Advantageously, said at least one point light source can comprise at least one of:
  at least one point light source, such as a LED, embedded within said diffuser element;

a light guide, such as an optical fiber or a periscope arrangement, passing through said diffuser element and configured to guide point light from a light source located in said gap;

at least one point light source located facing a removable part of said diffuser element such that, if said removable part is removed, this point light source illuminates the working volume in a direct and non-diffuse manner;

at least one point light source, such as a LED, located on a removable plate mounted on said diffuser element inside the working volume;

at least one spotlight located inside said working volume.

These options, taken individually or in combination, provide flexibility to optimize the visualization of objects, such as timepieces, jewelry items or the like.

Advantageously, the light box can comprise at least one reflector located is said gap, said at least one light source being mounted to said reflector facing said diffuser element. Intensity of the diffuse light may accordingly be improved.

Advantageously, said digital camera can be mounted on said diffuser element at least partly (preferably entirely) in said gap, said diffuser exhibiting an aperture aligned with the optical axis of said camera. Visibility of the camera when a reflecting object (such as a watch glass) is visualized may accordingly be minimized.

Advantageously, the light box further comprises a color gradient zone located on said diffuser around said aperture facing said working volume, said color gradient zone having a color tending to that of the diffuser on its outer part and having a color tending to black on its inner part.

Advantageously, said color gradient zone is provided on a film applied on said diffuser around said aperture.

Advantageously, said light box can comprise control members located on said casing and configured to control said camera and/or all of said light sources.

Advantageously, said light box can further comprise at least one supplemental reflector which cooperates with said diffuser element in order to delineate said working volume.

Advantageously, said light box can be configured to be dismantled or folded.

BRIEF DESCRIPTION OF THE DRAWINGS

Other details of the invention will appear more clearly from reading the following description, given with reference to the appended drawings in which.

EMBODIMENTS OF THE INVENTION

Figure 1:
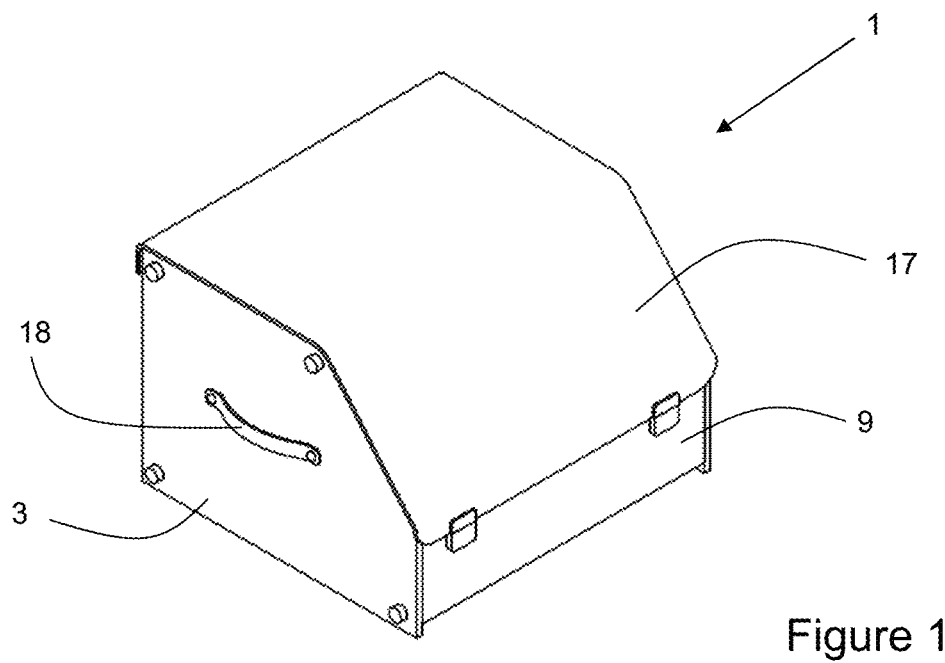
FIG. 1 is an external isometric view of a light box according to the invention, in transport configuration.
Figure 2:
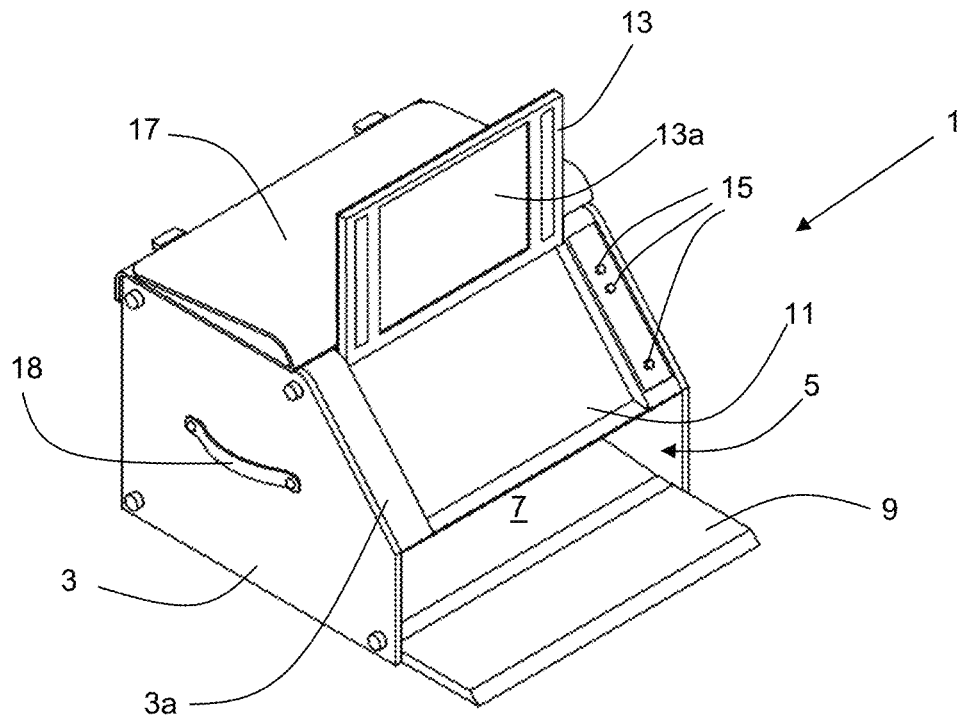
FIG. 2 is an external isometric view of the light box of FIG. 1, in working configuration.

FIGS. 1 and 2 illustrate a light box 1 according to the invention, as viewed from the outside. This light box 1 comprises a casing 3 defining a volume inside thereof, and provided with a frontal access 5 over the entire width of a face of the casing 3, which access is intended to be situated facing a user when the light box 1 is in use. However, an access 5 which does not extend over the entire width of the frontal face of the casing 3 is also possible, insofar as the user can easily access it with at least one hand, preferably with both hands. The casing 3 can be constructed in a rigid material, for instance in wood, metal or rigid plastic, in order to protect the elements located therein during transport.

The access 5 is shaped such that it allows a user to access the working volume 7 which is located inside the casing and which will be described hereafter in greater details with reference to FIGS. 3 to 5.

In addition, the access is closable by means of a flap 9, mounted pivotally on the casing 3 such as to open downwards (with respect to the orientation of the light box 1 in the working configuration) in order to allow unimpeded access for both hands of the user. Alternatively, instead of a flap 9, a removable plate could be provided to close the access 5.

In the illustrated embodiment, the casing 3 further comprising an accommodating space 11 for placement of a tablet computer on an oblique front face 3a of the casing 3, which is closable by means of a second flap 13 mounted pivotally on the casing 3 such as to allow opening thereof upwards. Alternatively, at least one screen can be integrated in the oblique frontal face 3a and/or in the face 13a of the second flap 13 intended to be situated facing the user and/or on top of the light box 1 when the light box 1 is in working configuration. Alternatively, an external screen can be used.

In order to control all of the electric and/or electronic elements integrated to the light box 1, control members 15 are also provided on the oblique face 3a of the casing 3, next to the accommodating space 11.

Finally, a flexible cover 17 is provided, the latter being configured to cover the upper face as well as the oblique face 3a in transport configuration, and ad-hoc handles 18 can be provided on the lateral sides of the casing in order to facilitate transport.

It is nevertheless to be noted that, according to a simpler embodiment, one or more of the flap 9, accommodating space 11, second flap 13, control members 15, cover 17 and handles 18 may be omitted, and that the shape of the casing 3 may be selected in an ad-hoc manner.

Figure 3:
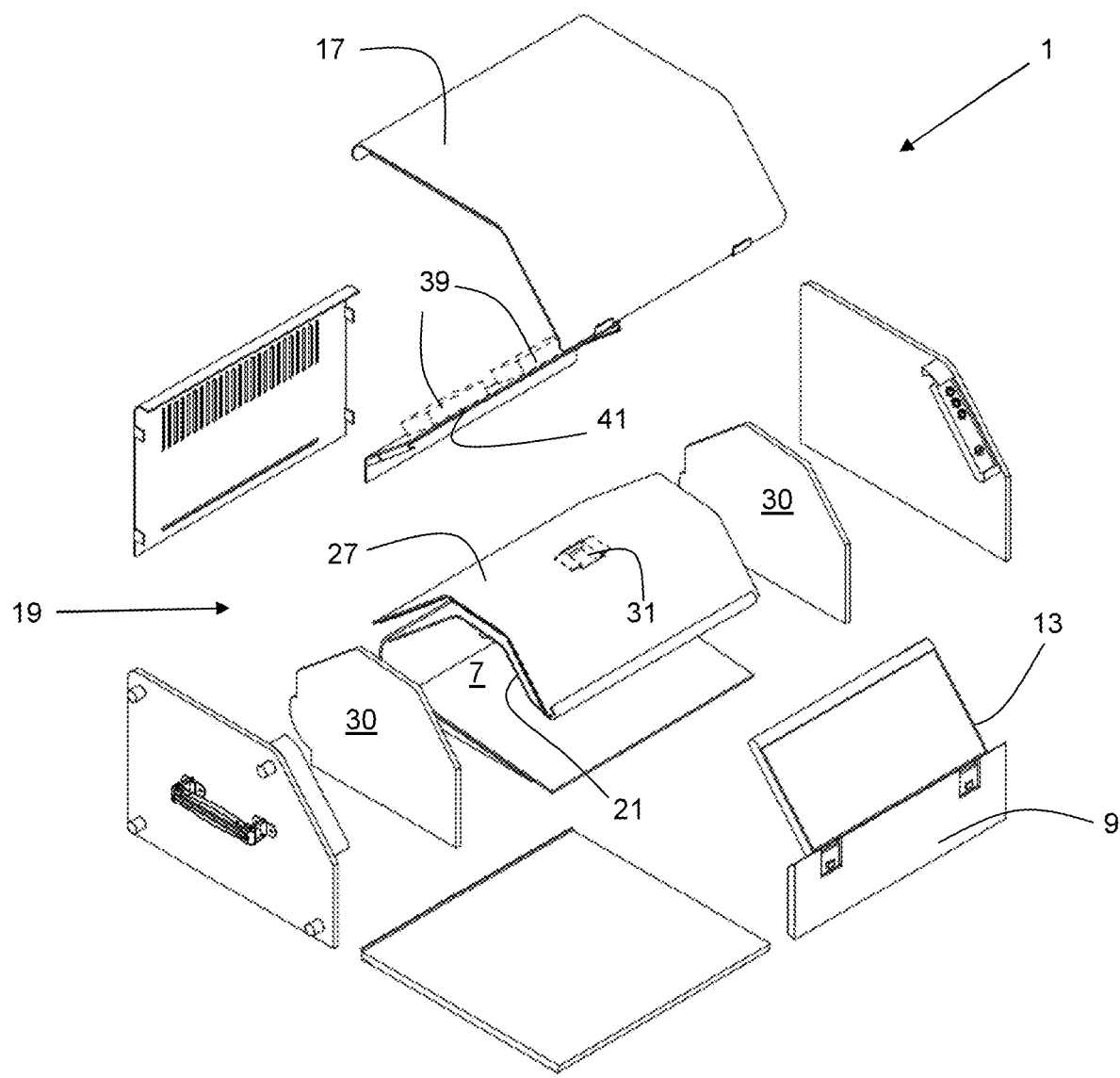
FIG. 3 is an exploded isometric view of a first specific variant of a light box according to the invention, of which certain elements of the casing have not been represented.
Figure 4:
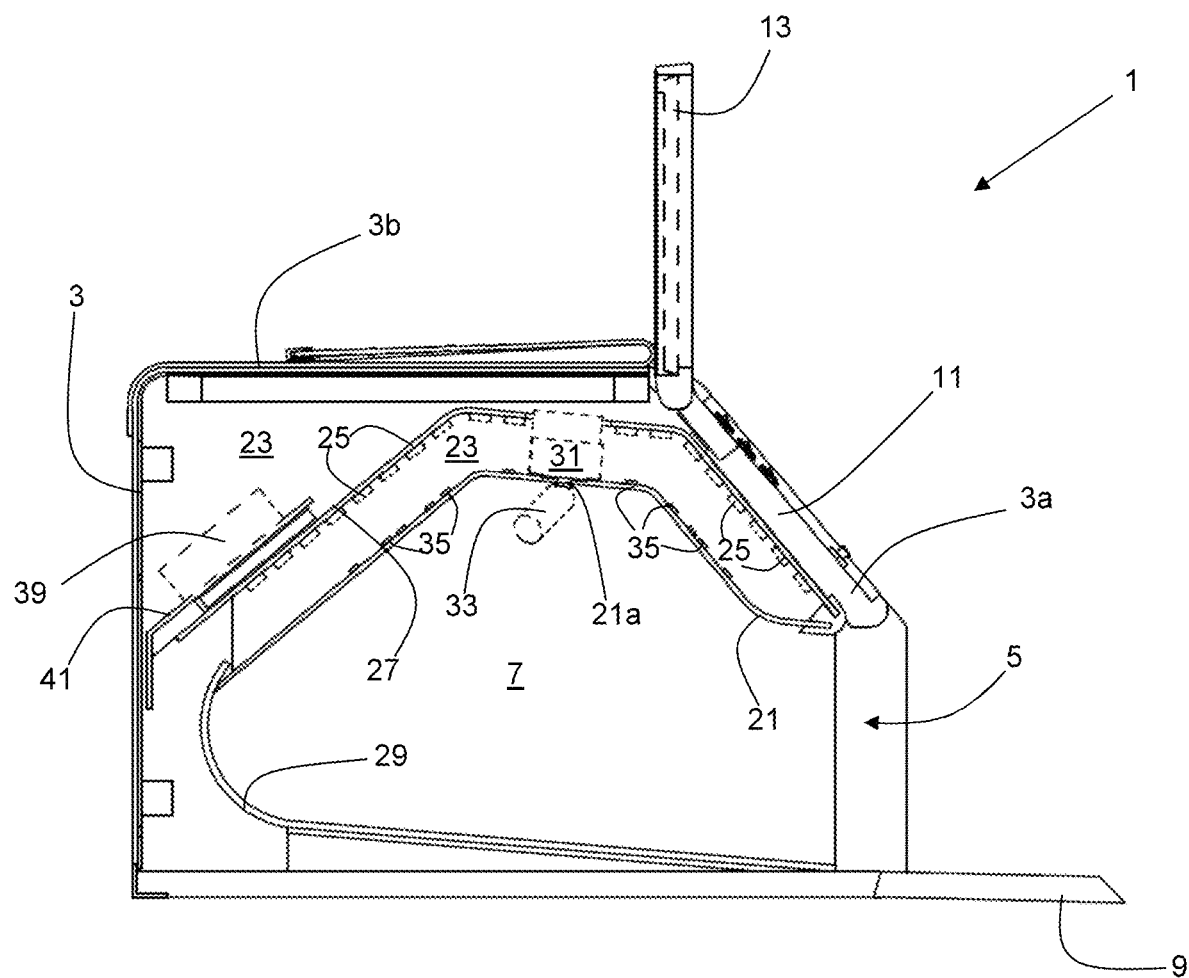
FIG. 4 is a cross-sectional side view of the light box of FIG. 3, the cross-section being taken through the camera and the viewing direction being parallel to the plane of the frontal face of the casing.
Figure 5:
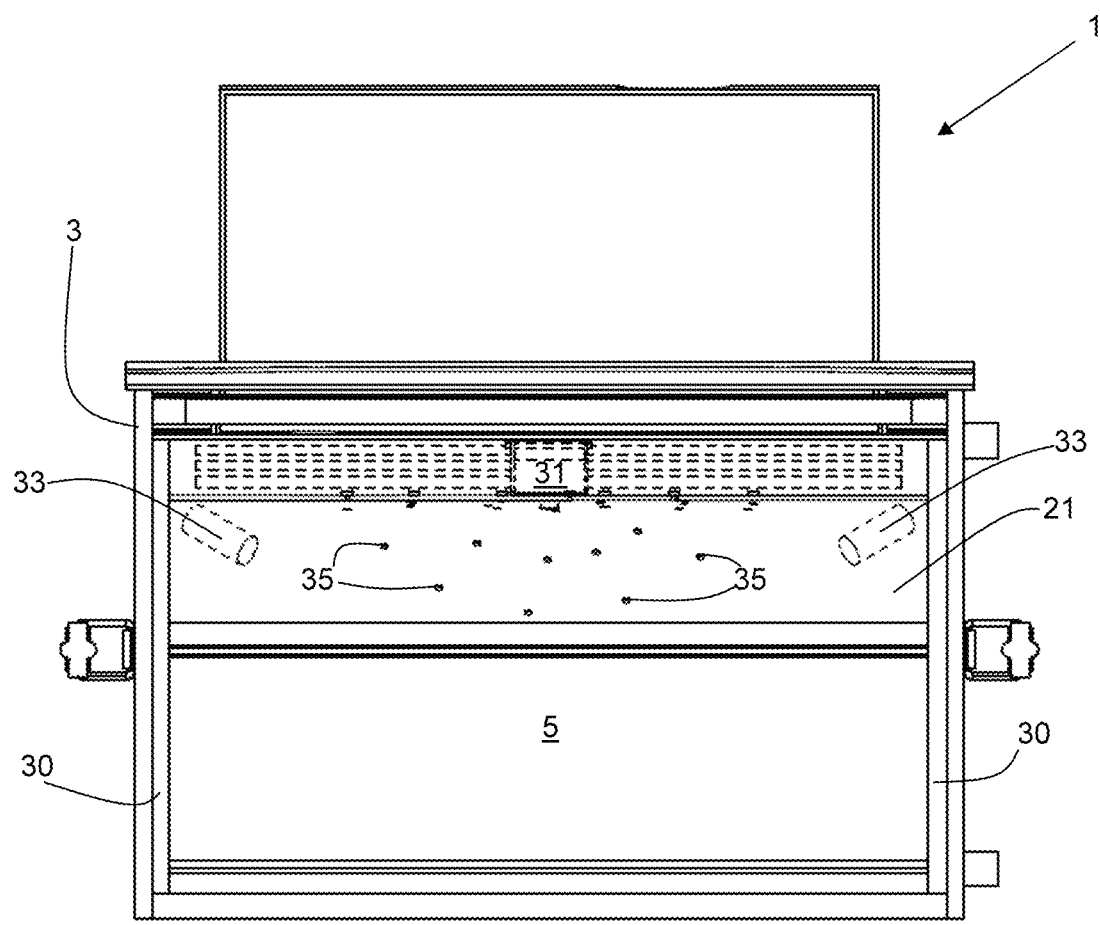
FIG. 5 is a cross-sectional longitudinal view of the light box of FIG. 3, the cross-section being taken through the camera and the viewing direction being perpendicular to the plane of the frontal face of the casing.

Inside the casing 3 there is provided an illumination and visualization system 19, of which a first embodiment is illustrated in FIGS. 3 to 5.

The system 19 comprises a diffuser element 21 (hereafter simply referred to as "diffuser") which serves to delineate the upper side of the working volume 7, and which is, in the illustrated embodiment, of generally concave shape defined by a plate bent along two lines in order to define three surfaces forming an obtuse angle between them. However, the shape of the illustrated diffuser 21 is not compulsory, and the latter can be planar or of any appropriate shape and selected in an ad-hoc manner. For instance, a "tent" shape formed of two, three, four, five or even more planar sections could be contemplated.

The diffuser 21 is typically made of translucent plastic material, as generally known in the art, and is positioned inside the inner volume of the casing 3 such as to define a gap 23 between the upper wall 3b of the casing and the diffuser 21. Inside this gap there is provided at least one light source 25, here shown as a plurality of LEDs mounted on a reflector 27 facing the diffuser 21, the reflector 27 extending substantially parallel to the diffuser 21. Typically, the reflector 27 is of a diffuse reflection type, but this is not compulsory. Indeed, the presence of the reflector 27 is not compulsory either, the said at least one light source 25 being supported inside the gap 23 on any given support or attached directly on one of the walls of the casing 3, which could be of white color if a diffuse reflection effect is desired anyways.

The lower part of the working volume 7 is defined by a supplemental reflector 29 of diffuse reflection, which is inclined and exhibits a curved border in order to rejoin the diffuser 21 at the rear of the inner volume of the casing 3. Again, this supplemental reflector 29, which is typically of white color, is optional and could be omitted, the interior of the bottom of the casing 3 being providable with an appropriate coloration (white, black, or any other desired color shade). The lateral sides of the working volume 7 are defined by lateral reflectors 30, also of the diffuse type, which, similarly, could potentially be omitted for the sake of simplification.

By these means, the interior of the working volume 7 can be flooded with diffuse light.

In order to visualize an object, such as a timepiece, a jewelry item or the like (for instance writing instruments, small mechanical objects, coins, and the like), located or held by a user inside the working volume 7, a digital camera 31 (for still images and/or video) is mounted inside the casing 3 such as to allow visualization of at least part of the working volume 7. In the illustrated embodiment, this camera 31 is mounted on the diffuser 21 inside the gap 23 (namely on the side of the diffuser 21 which faces the gap 23), its optical axis being aligned with an aperture 21a provided at an ad-hoc location (typically at or next to the upper part of the diffuser 21) in order to capture images through said aperture 21a of an object presented to the camera inside the working volume 7. In this way, the camera 31 can be connected to a tablet computer placed on the casing 3, to a computer integrated in the light box 1 or to another computer, smartphone or the like, in order to record pictures and videos, and to show the piece to a third party via videoconferencing or the like. It is also possible to provide a supplemental aperture (not shown) leading from the outside of the light box 1 up to the inside of the working volume 7 to allow use of an external camera, be it a dedicated camera or an integrated camera of a smartphone, tablet or the like.

The means described hitherto allow to visualize objects in general, but the light box 1 according to the invention exhibits additional aspects allowing to improve visualization of certain objects, such as (but not limited to) timepieces and jewelry items.

Firstly, in order to generate sparkles on cut stones forming part of the object, a plurality of point light sources 35 are provided in order to provide a direct point illumination. In the illustrated embodiment, these point light sources 35 are LEDs that are mounted on the diffuser 21, preferably flush with its surface which faces the working volume 7, such as to emit their light in the working volume 7 without any diffusion effect. Alternatively, the point light sources could be defined by the terminal ends of a plurality of waveguides, such as optical fibers, periscopes extending through the diffuser 21 or the like, and configured to guide light emitted by a light source located inside the gap 23 or elsewhere inside the light box 1. The points of light thus created by the point light sources 35 in particular help to lead the cut stones to sparkle and can also improve the visual impression of faceted reflecting surfaces and the like. It is also possible to provide bars of additional LEDs inside the working volume.

Secondly, in order to assist making surface textures more visible, such as guilloche, relief or textured patterns or the like, where color contrast is very limited, at least one point light source of a different type is also provided, in particular at least one spotlight 33 located inside the working volume. This spotlight 33 is preferably of adjustable direction and configured to illuminate the object to visualize with direct light (that is not diffused) and oblique. In the illustrated embodiment, two spotlights 33 are provided, positioned symmetrically on either side of the aperture 21a and attached to the diffuser 21, that is to the lateral walls of the casing 3. These spotlights 33 can be of any given type (LED, incandescent, fluorescent, and the like), and any number thereof could be provided. This being said, the presence thereof is not compulsory.

Since it is sometimes useful to allow to vary the illumination in dependence of the properties of the visualized object, one, the other, or both of the spotlights 33 and the point light sources 35 could be switched off, in particular by means of the control members 15. For instance, in case of visualization of a timepiece devoid of any cut stones, the point light sources 35 could be switched off in order to avoid reflections on the watch glass. Furthermore, if the spotlights 33 give rise to troublesome reflections, they can likewise be switched off.

Power supply to the camera 31 as well as to the light sources 25, 33, 35 is ensured by an electrical source 39, which may comprise one ore more batteries, one or more transformers for transforming current from the grid or the like, mounted between the reflector 27 and the casing 3, for instance on a mounting plate 41 attached to a wall of the latter.

A disadvantage of the construction shown in FIGS. 3 to 5 resides in the fact that the point light sources 35 extend through the diffuser 21 and, as a consequence, are visible as dark points when they are switched off. When visualizing a watch, for instance, reflections thereof may be visible on the watch glass, and perception of a material or color could be negatively influenced.

The constructions shown in FIGS. 6 to 10 overcomes this problem. Most of the elements remain unchanged with respect to the embodiment of FIGS. 3 to 5, and will not accordingly be described again. In addition, only those reference signs mentioned here below are reproduced on this Figures.

Figure 6:
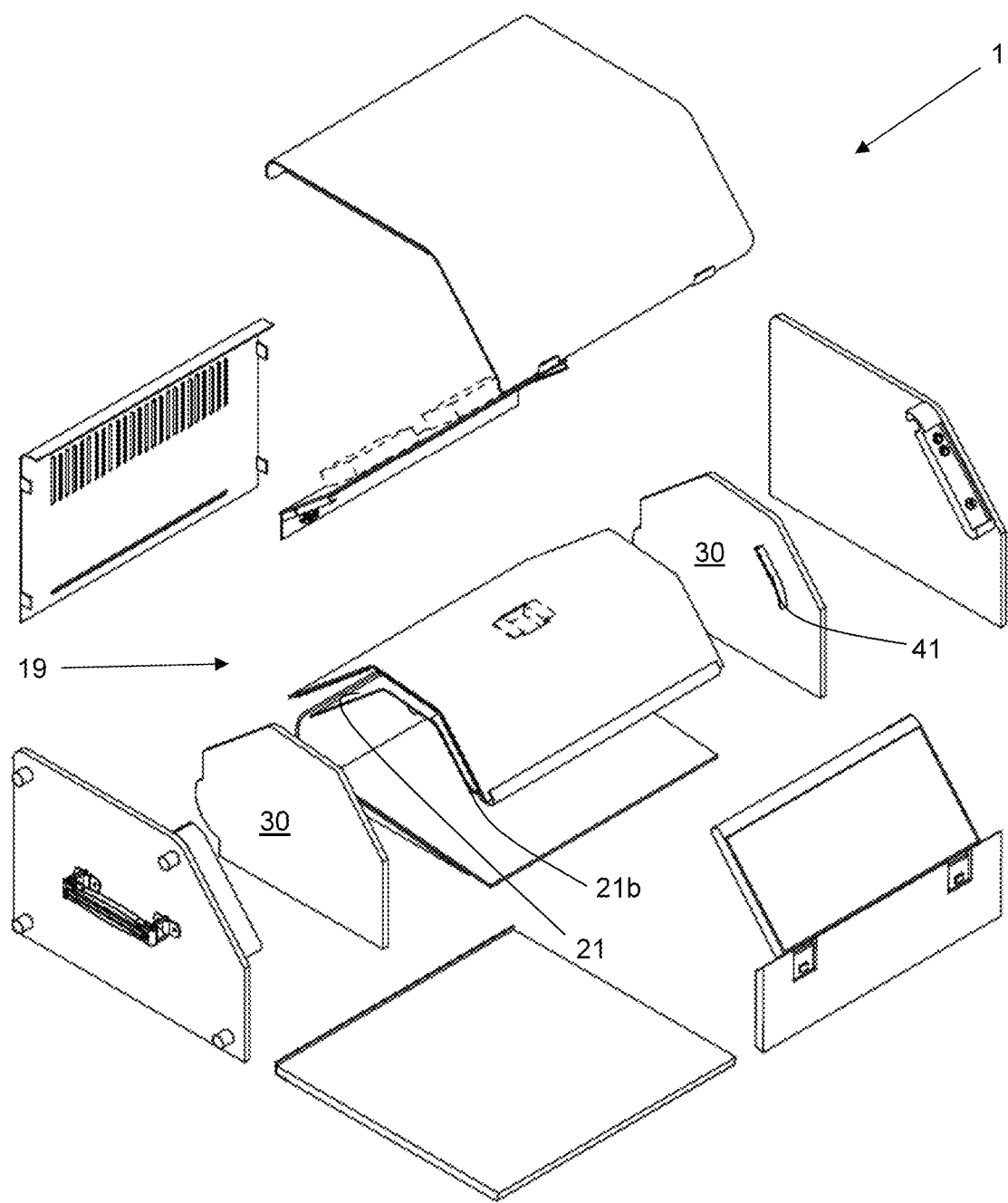
FIG. 6 is an exploded isometric view of a second specific variant of a light box according to the invention, of which certain elements of the casing have not been represented.
Figure 7:
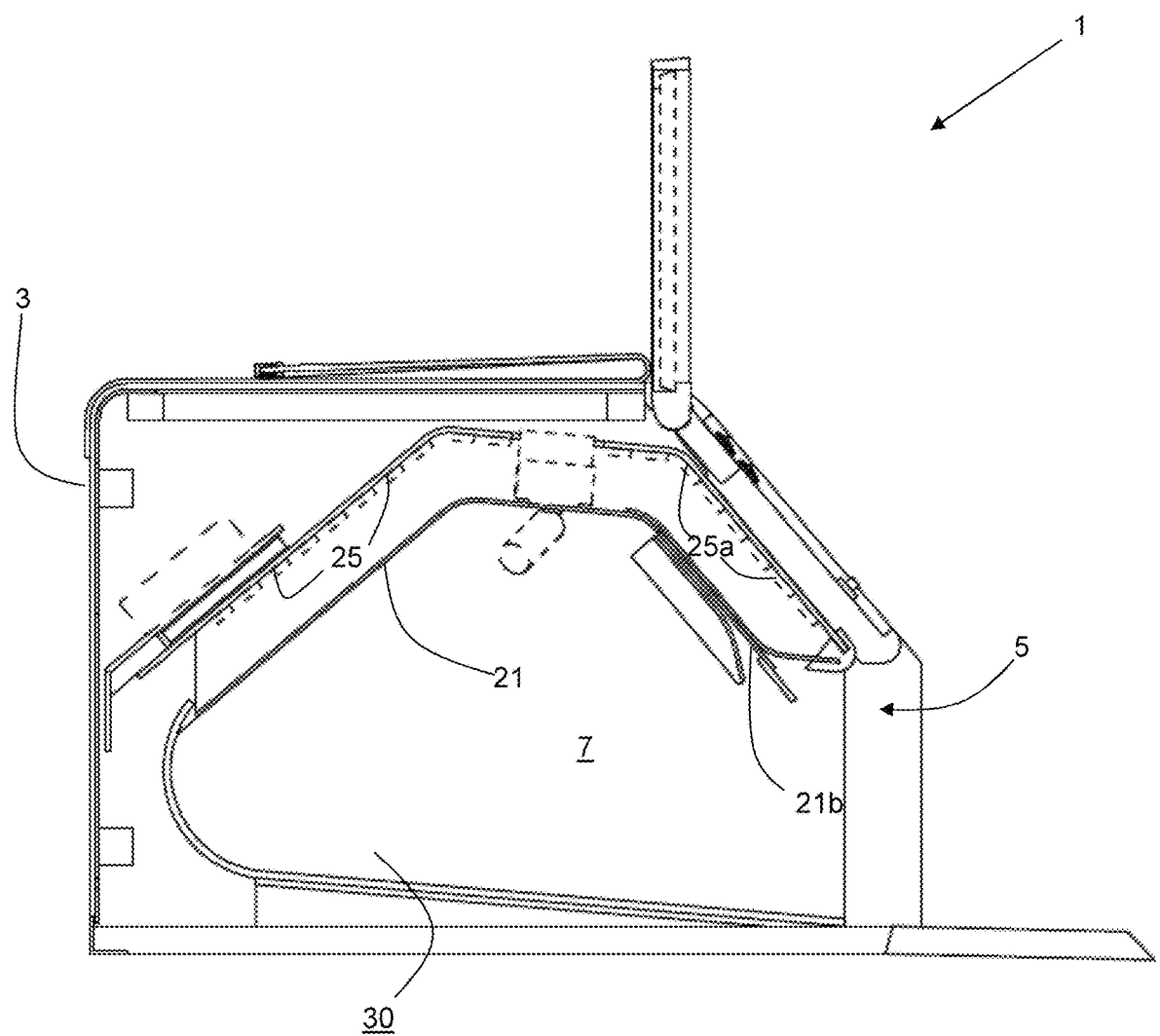
FIG. 7 is a cross-sectional side view of the light box of FIG. 6, the cross-section being taken through the camera and the viewing direction being parallel to the plane of the frontal face of the casing.
Figure 8:
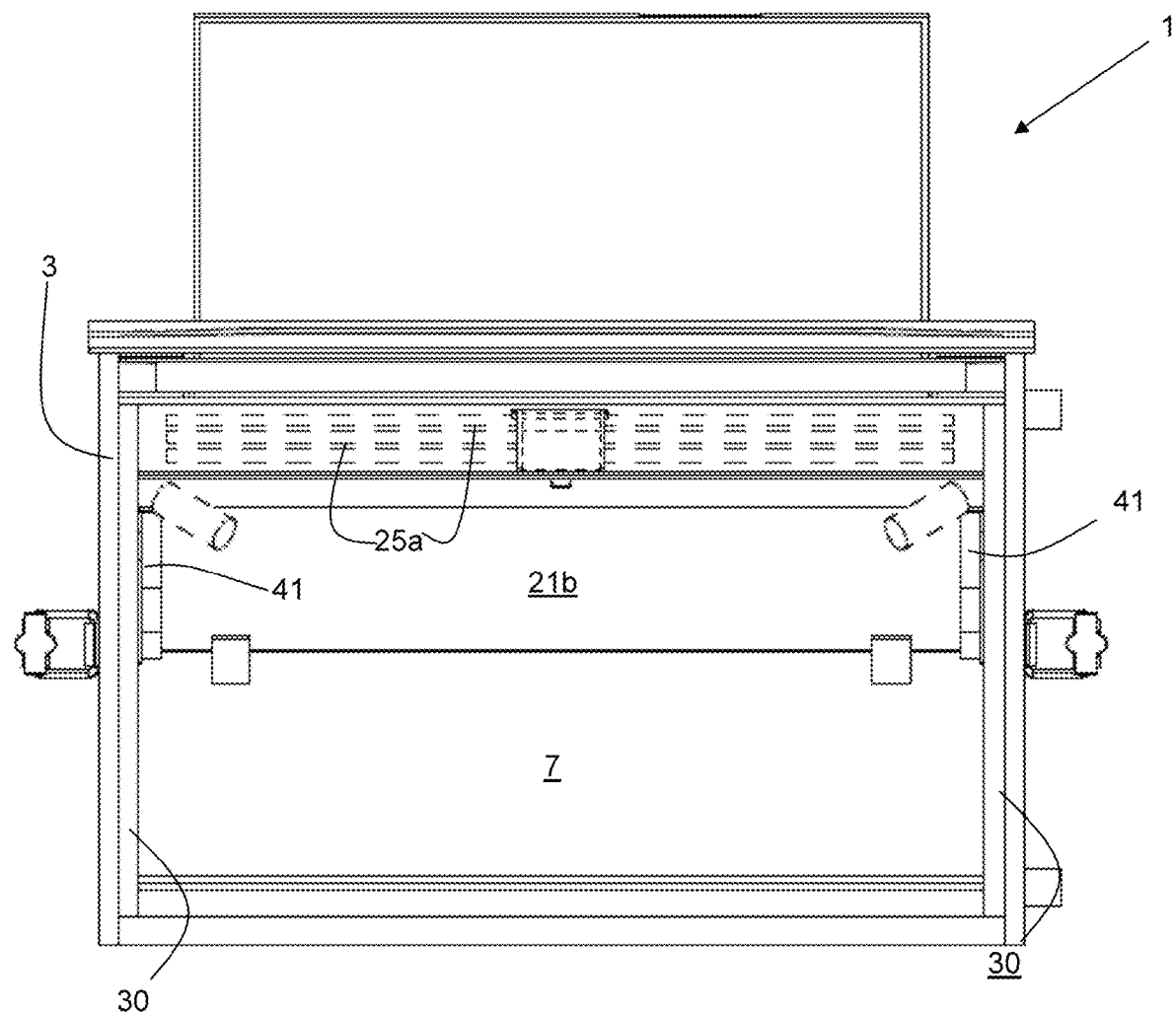
FIG. 8 is a cross-sectional longitudinal view of the light box of FIG. 6, the cross-section being taken through the camera and the viewing direction being perpendicular to the plane of the frontal face of the casing.

In this embodiment, the diffuser 21 is devoid of point light sources 35 and, instead, the diffuser 21 comprises a removable section 21b, visible on FIGS. 6 to 8. This removable part 21b is supported by ad-hoc mounting supports 41 (here shown as brackets attached to the lateral reflectors 30 or, in the absence thereof, to lateral walls of the casing 3) such as to allow a user to remove it in order to expose a certain number 25a of the light sources 25 to the working volume 7. These light sources 25a can thus not only contribute to the diffuse illumination when the removable part 21b of the diffuser 21 is mounted, but also to emit light directly inside the working volume 7 when said removable part 21b is removed, without subjecting the light thereof to diffusion, and thereby allow to provide points of direct light without leaving visible dark points when an exclusively diffuse illumination is desired.

Figure 9:
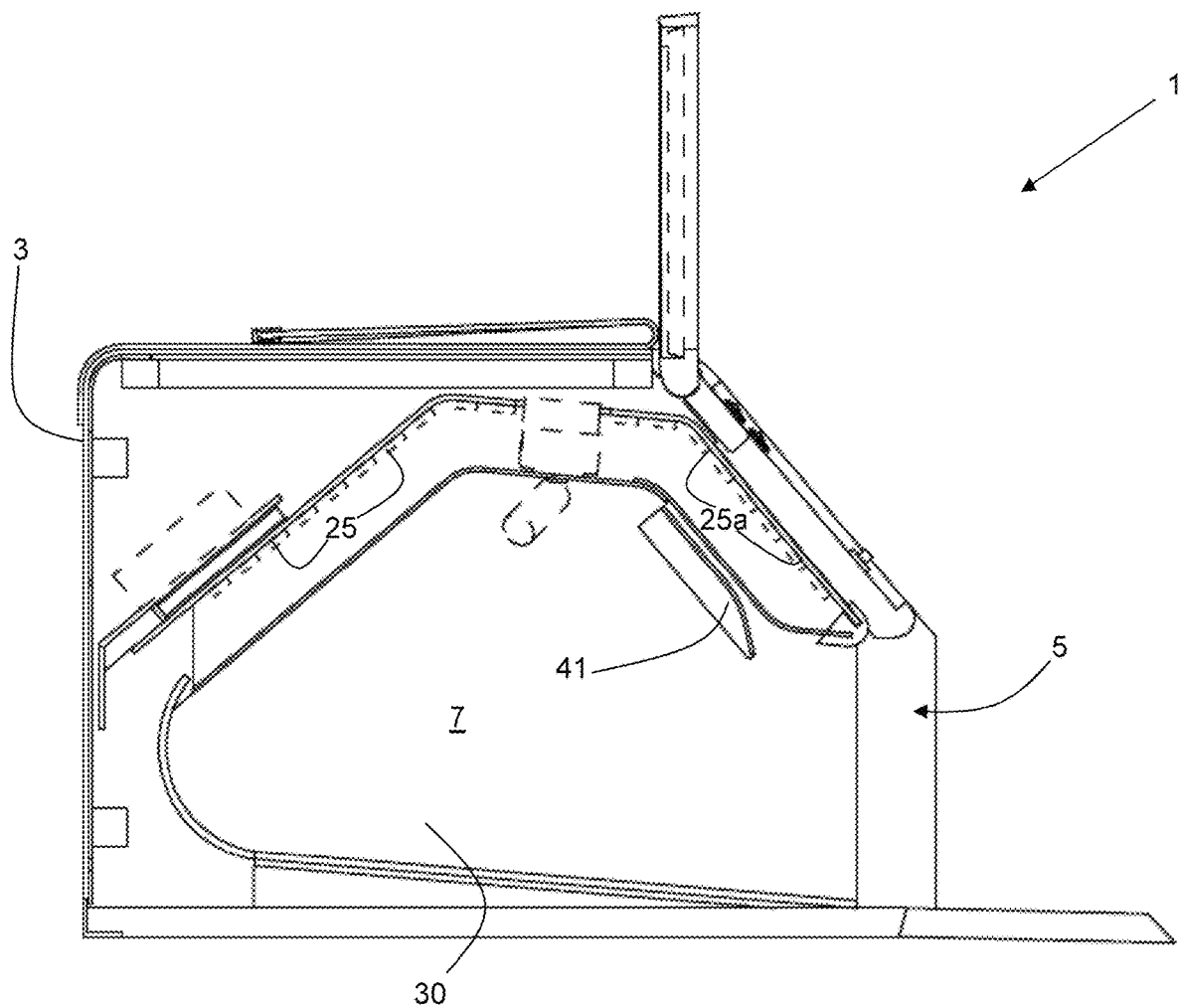
FIG. 9 is a view similar to that of FIG. 7, the removable part of the diffuser having been removed.
Figure 10:
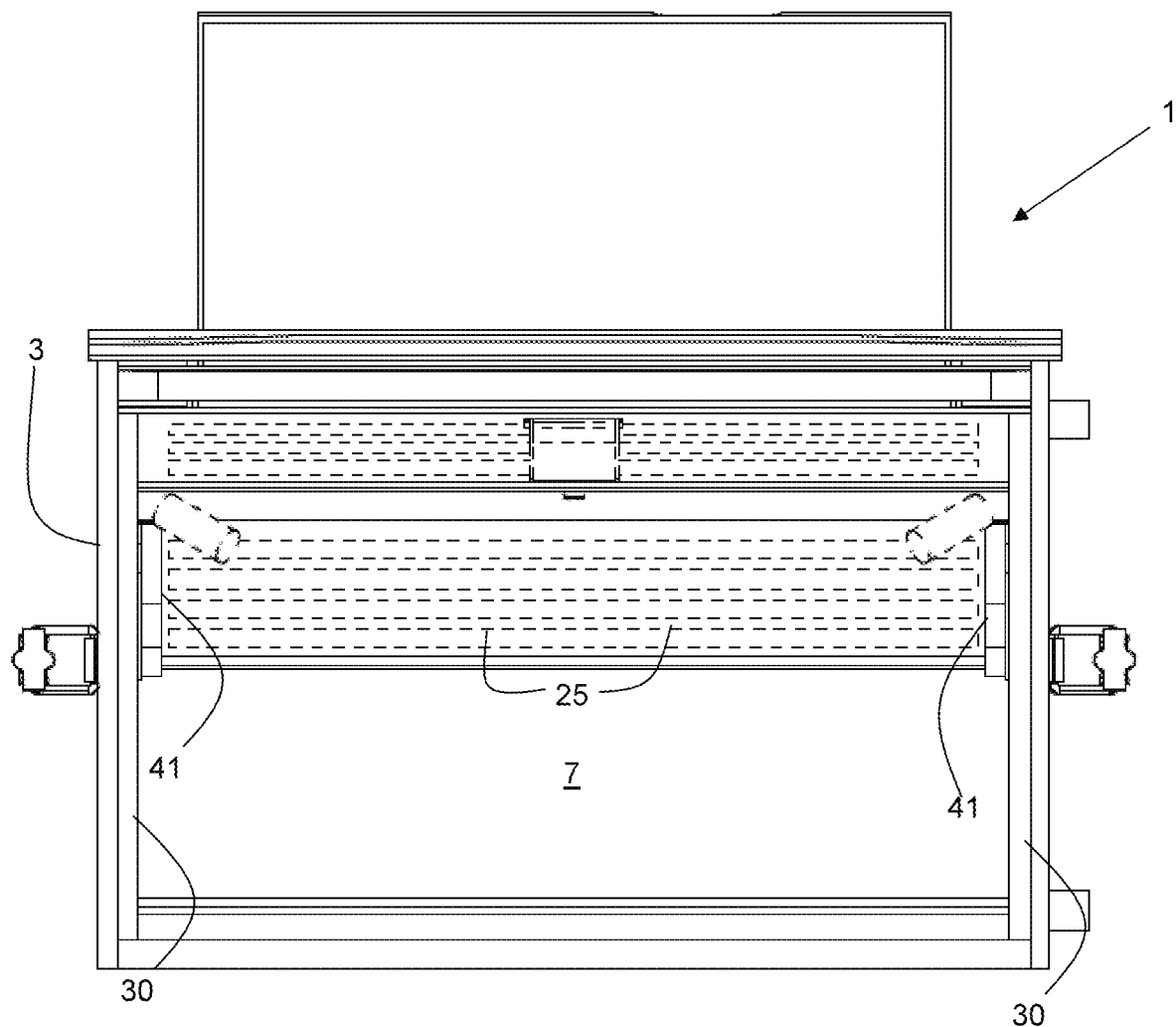
FIG. 10 is a view similar to that of FIG. 8, the removable part of the diffuser having been removed.

Advantageously, the removable part 21b is located on the zone of the diffuser 21 which is the closest to the access 5, and when it is removed (as illustrated in FIGS. 9 and 10), the light sources 25a that are located facing the opening thus cleared are made directly visible from the working volume 7.

In another variant of the light box 1 according to the invention, which is not represented, the point light sources 35 could be mounted on a removable plate that can be mounted in a similar fashion to the removable part 21b of the diffuser 21, the latter being contiguous and without any opening.

In view of the above considerations, it is clear that each embodiment of a light box 1 according to the invention represents a solution fully integrated in a single casing, which is readily transportable and easy to use.

Figure 11:
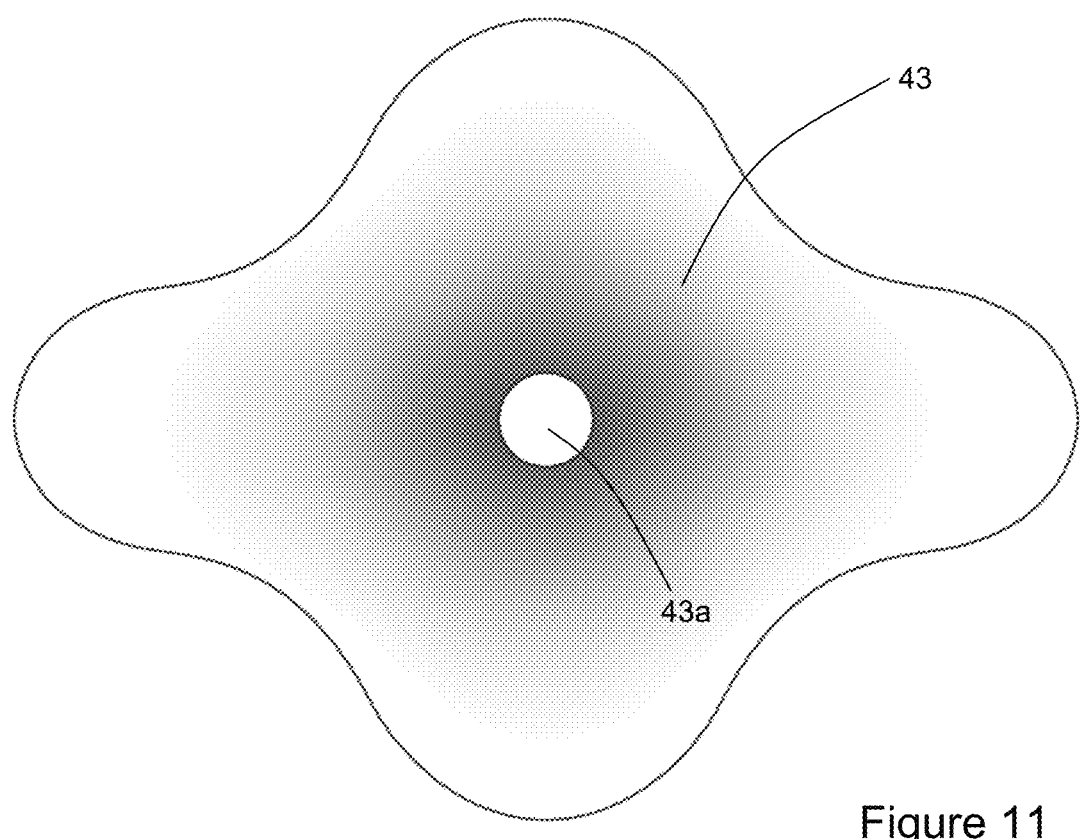
FIG. 11 is a view of a backlighting element designed to hide the aperture of the camera in reflections on a piece under observation.
Figure 12:
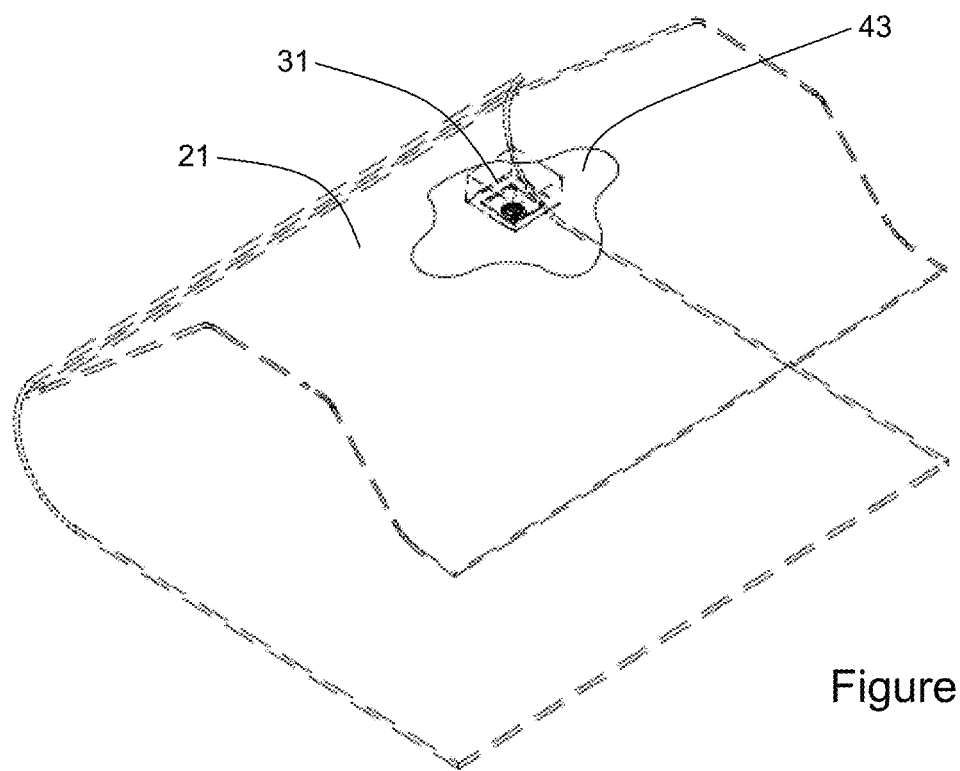
FIG. 12 is a transparent isometric view illustrating the arrangement of the backlighting element.

FIGS. 11 and 12 illustrate an optional color gradient zone 43, which serves to at least partly hide the aperture 21a provided for the camera 31. The color gradient zone 43 can be formed directly on the diffuser 21 around the aperture 21a, for instance by printing or on a transparent or opaque film that is applied on the diffuser 21, the color gradient zone 43 being located in each case on the surface of the diffuser 21 which is positioned facing the working volume 7. In the case of a film, the central portion of the backlighting element 43, which is aligned with the aperture 21a, can be an opening or a transparent zone, and it can be circular, oval, polygonal, with lobes, irregular or any other appropriate shape.

The outer part of the color gradient zone 43 has a color tending to that of the diffuser 21 (typically white or quasi-white), its inner part tending to black (that is to say black or a dark grey). The shape of the color gradient zone 43 is typically circular, but can also be oval, polygonal, irregular, star-shaped, or any other appropriate shape.

By these means, the appearance of the aperture 21a in reflections on a piece which is being visualized is minimized or even eliminated, the abrupt transition between the white of the diffuser 21 and the black of the aperture 21a, which gives rise to a significant visibility in reflections, having been eliminated.

Although the invention has been described here above with reference to specific embodiments, other supplemental variants could be contemplated without departing from the scope of the invention as defined by the claims. It is to be noted, in particular, that it is also possible to construct a light box according to the invention such as to be dismantlable or foldable.

The invention claimed is:

1. A light box for photography or videography of an object, comprising:

a casing comprising a plurality of walls defining an inner volume as well as an access provided on a face of the casing and intended to be directed towards a user, the access being shaped to allow the user to insert at least one hand therethrough; and an illumination and visualization system housed inside the casing and defining a working volume in communication with the access, wherein the illumination and visualization system comprises:

at least one light diffuser element which is located at a predetermined distance from at least one of the walls in order to define a gap between the light diffuser element and the at least one of the walls, the light diffuser element delineating at least partly the working volume;

at least one light source located in the gap and configured to illuminate the working volume in a diffuse manner through the light diffuser element;

at least one switchable, maskable or removable point light source configured to illuminate directly the working volume; and at least one digital camera mounted inside the casing and configured to allow photographing of at least a part of the working volume, wherein the digital camera is mounted on the light diffuser element in the gap, the light diffuser element exhibiting an aperture aligned with the optical axis of the digital camera, and wherein the light box further comprises a color gradient zone located on the light diffuser element around the aperture facing the working volume, the color gradient zone having a color tending to that of the light diffuser element on its outer part and having a color tending to black on its inner part.

2. The light box according to claim 1, wherein the access is closable.

3. The light box according to claim 2, wherein the access is closable by means of a flap mounted pivotally on the casing or by means of a plate mounted removably on the casing.

4. The light box according to claim 1, comprising a support configured to support a screen, a smartphone or a tablet computer on the outside of the casing facing the user.

5. The light box according to claim 1, wherein the at least one point light source comprises at least one of:

at least one point light source embedded within the light diffuser element;

a light guide passing through the light diffuser element and configured to guide point light from a light source located in the gap;

at least one point light source located facing a removable part of the light diffuser element;

at least one point light source located on a removable plate mounted on the light diffuser element; and at least one spotlight located inside the working volume.

6. The Light box according to claim 1, comprising at least one reflector located in the gap, the at least one light source being mounted to the reflector facing the light diffuser element.

7. The light box according to claim 1, wherein the color gradient zone is provided on a film applied on the light diffuser element around the aperture.

8. The light box according to claim 1, comprising control members located on the casing and configured to control the digital camera and/or or all of the light sources.

9. The light box according to claim 1, further comprising at least one supplemental reflector which cooperates with the light diffuser element in order to delineate the working volume.

10. The light box according to claim 1, wherein the light box is configured to be dismantled or folded.

11. A light box for photography or videography of an object, comprising:
- a casing comprising a plurality of walls defining an inner volume as well as an access provided on a face of the casing and intended to be directed towards a user, the access being shaped to allow the user to insert at least one hand therethrough; and
- an illumination and visualization system housed inside the casing and defining a working volume in communication with the access,
- wherein the illumination and visualization system comprises:
  - at least one light diffuser element which is located at a predetermined distance from at least one of the walls in order to define a gap between the light diffuser element and the at least one of the walls, the light diffuser element delineating at least partly the working volume;
  - at least one light source located in the gap and configured to illuminate the working volume in a diffuse manner through the light diffuser element; and
  - at least one digital camera configured to allow photographing of at least a part of the working volume,
- wherein the light diffuser element exhibits an aperture aligned with the optical axis of the digital camera,
- and wherein the light box further comprises a color gradient zone located on the light diffuser element around the aperture facing the working volume, the color gradient zone having a color tending to that of the light diffuser element on its outer part and having a color tending to black on its inner part.

12. The light box according to claim 11, wherein the color gradient zone is provided on a film applied on the light diffuser element around the aperture.

13. The light box according to claim 11, wherein the digital camera is mounted inside the casing.

14. The light box according to claim 13, wherein the digital camera is mounted on the light diffuser element in the gap.

15. The light box according to claim 11, wherein the digital camera is an external camera and wherein the casing is provided with a supplemental aperture leading from an outside of the light box up to an inside of the working volume to allow use of the external camera.

16. The light box according to claim 15, wherein the casing is configured to support a tablet computer or a smartphone and wherein the external camera is an integrated camera of the tablet computer or smartphone.

* * * * *